No. 637,266. Patented Nov. 21, 1899.
J. KEIM.
APPARATUS FOR REMOVING FOREIGN SUBSTANCES FROM WATER METERS.
(Application filed Sept. 30, 1898.)
(No Model.)
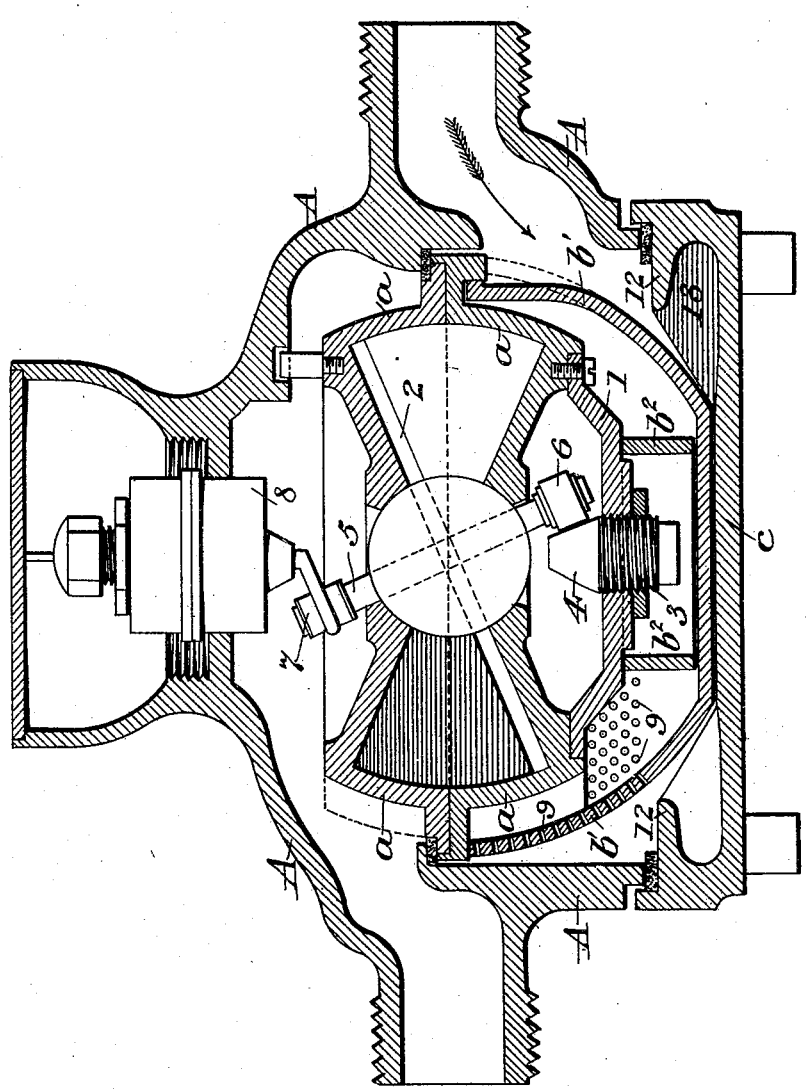
Witnesses:
Florence Coffman.
Ella Morris.
Inventor:
Julius Keim
By
Attorney.

UNITED STATES PATENT OFFICE.

JULIUS KEIM, OF WEISSENFELS, GERMANY.

APPARATUS FOR REMOVING FOREIGN SUBSTANCES FROM WATER-METERS.

SPECIFICATION forming part of Letters Patent No. 637,266, dated November 21, 1899.

Application filed September 30, 1898. Serial No. 692,340. (No model.)

*To all whom it may concern:*

Be it known that I, JULIUS KEIM, manufacturer, a subject of the King of Prussia, Emperor of Germany, residing at Weissenfels, Prussia, German Empire, have invented certain new and useful Improvements in Apparatus for Removing Foreign Substances from Water-Meters, of which the following is a full, clear, and exact description.

The object of the present invention is an apparatus for removing foreign substances from water-meters, in which the quantity of water is registered by a disk that is turned by means of the body of water flowing through—that is to say, especially Thomson water-meters. It is true that apparatus of the kind have been constructed in different forms. For instance, grooves, channels, recesses, or small filtering-pieces have been arranged for collecting the extraneous substances; but none of these contrivances have really effected the intended object, as these substances are constantly stirred up again by the water flowing in afterward and therewith carried into the apparatus, where they lie in the lower corners, causing considerable damage and frequent interference with the action of the water-meter.

The present invention consists in an apparatus for separating extraneous substances in water-meters, and which completely obviates the disadvantages attaching to such contrivances. For this purpose a filtering apparatus resembling a cup is provided, the meshes being so arranged that it is impossible for the water to flow direct through the pipe. The filtering apparatus is in fact provided with meshes on one side only—viz., on the side lying opposite to the inlet-opening. The water flowing in is thus obliged to dash against the solid wall of the filtering apparatus and forced at first to run downward and then around the cup-like part of the filtering apparatus, so as to penetrate from the side and from behind into the interior of the sieve. The consequence of this is that the extraneous substances in the water—such as small pieces of tin and grains of sand, &c., which are constantly carried along with the water—must be deposited, as being of greater specific gravity they must sink downward more quickly than the particles of water penned underneath the sieve. In a casing suitably provided the extraneous substances can easily collect and be from time to time removed from the water-meter.

In the accompanying drawing the object of the invention is illustrated, the drawing showing a section through a so-called "Thomson" water-meter.

Between the disk-casing $a$ of the water-meter and the screw-closing cover $c$ of the same is the filtering apparatus $b'$. The latter, as already mentioned, is in shape like a cup, and when the whole internal construction is firmly screwed serves, with the ring $b^2$, as support for the disk-casing $a$. The filtering apparatus $b'$ has only on the hemispherical part lying opposite to the inlet-opening perforations 9, as will be seen from the drawing, so that the water when it dashes in the direction of the arrow against $b'$ is forced to flow downward and to reach the interior from the back and sides. In this way it must deposit the extraneous substances which it contains, as these are of greater specific gravity and therefore settle down more quickly than the body of water penned downward.

On the water-meter casing A a cover $c$ is arranged, this cover being furnished with an inward-projecting wall 12 and transversal ribs 13, so that separate small chambers are formed. In these chambers the extraneous substances settle down and can be removed by taking off the cover. Any washing or stirring up of the extraneous substances by the body of water subsequently flowing through is impossible, nor can these substances enter the interior straining-chamber and there cause damage or interference with the working.

What I claim, and desire to secure by Letters Patent, is—

In an apparatus, of the class described, the combination, comprising the cup-shaped filtering device, having the solid side next to the inlet-aperture and the perforations opposite said aperture; also having the removable cover $c$ having the projecting rim 12, and transversal ribs 13, as and for the uses and purposes herein set forth and substantially specified.

In witness whereof I subscribe my signature in presence of two witnesses.

JULIUS KEIM.

Witnesses:
 RUDOLPH FRICKE,
 OSWALD KÖRNER.